United States Patent [19]

Campbell

[11] Patent Number: 5,439,152

[45] Date of Patent: Aug. 8, 1995

[54] EXTENDABLE CARRIER RACK FOR PICK-UP TRUCKS

[76] Inventor: Samuel Campbell, 636 E. 92nd St., Brooklyn, N.Y. 11236

[21] Appl. No.: 243,260

[22] Filed: May 16, 1994

[51] Int. Cl.⁶ .............................................. B60R 9/045
[52] U.S. Cl. ................................. 224/405; 224/42.01; 224/309; 224/325; 224/542; 224/549; 224/551; 296/3; 211/195; 108/55.1; 280/769
[58] Field of Search ............... 224/42.42, 42.45 R, 224/42.01, 29.5, 309, 310, 311, 314, 325; 296/3; 211/175, 177, 195, 208; 108/44, 129, 157, 51.1, 55.1, 56.1, 56.3, 57.1, 116, 126, 160; 280/35, 79.3, 756, 769; 135/88, 101, 103

[56] References Cited

U.S. PATENT DOCUMENTS 3,857,494 12/1974 Giardini .............................. 211/177
5,152,570 10/1992 Hood ................................... 296/3

Primary Examiner—Henry J. Recla
Assistant Examiner—Peter S. Hrycko

[57] ABSTRACT

An extendable carrier rack comprising a pair of L-shaped base legs, each base leg having a horizontal outer side rail coupled to an upwardly extended outer support rail thus creating an upper free end, a lower free end, and a corner therebetween; a pair L-shaped extension legs, each extension leg having a horizontal inner side rail coupled to an upwardly extended outer support rail thus creating an upper free end, a lower free end, and a corner therebetween with the lower free ends of the extension legs each coupled with a separate free end of a base leg; a pair of L-shaped bottom rails with one bottom rail coupled to the corners of separate base legs and the other bottom rail coupled to the corners of separate extension legs, whereby the base legs, extension legs, and bottom rails define a pedestal having a base section and an upwardly extended legged section adapted to be placed in and secured to a vehicle; and a pair of u-shaped holding legs with each holding leg having a top rail and a pair of inner extension rails extended downwards therefrom and terminated at a pair of lower free ends with the lower free ends of one holding leg coupled with the upper free ends of the base legs and the lower free ends of the other holding leg coupled with the upper free ends of the extension legs.

2 Claims, 4 Drawing Sheets

FIG. 7
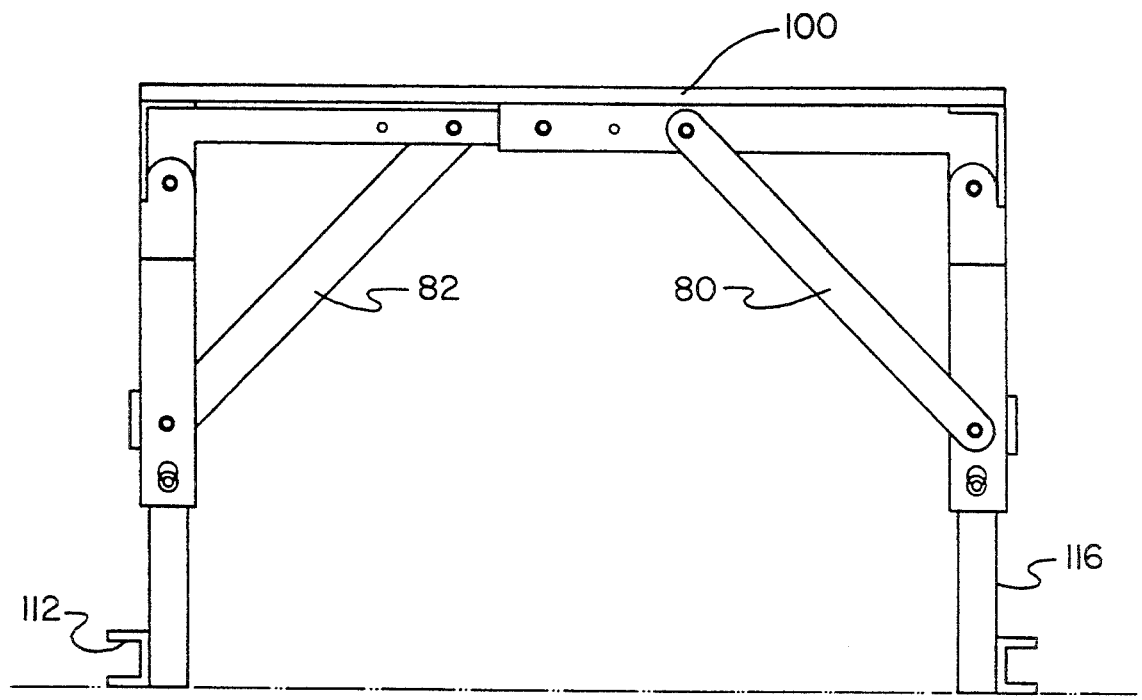
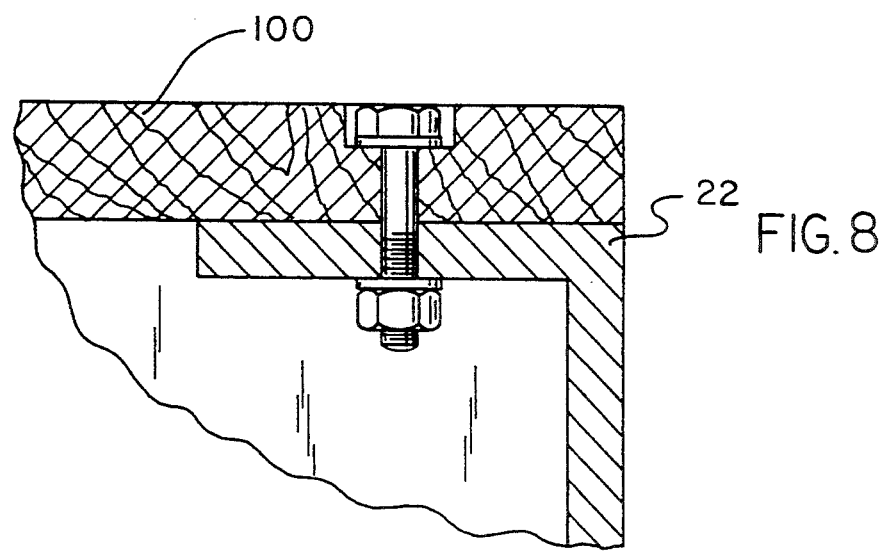
FIG. 8

EXTENDABLE CARRIER RACK FOR PICK-UP TRUCKS

BACKGROUND OF THE INVENTION

1. Field of the Invention

The present invention relates to an extendable carrier rack for pick-up trucks and more particularly pertains to holding and supporting items thereon from a bed of a pick-up truck for transporting from one location to another with an extendable carrier rack for pick-up trucks.

2. Description of the Prior Art

The use of pickup truck carrier racks is known in the prior art. More specifically, pickup truck carrier racks heretofore devised and utilized for the purpose of holding and supporting items thereon are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 262,698 to Hagist discloses a carrier rack for pickup trucks. U.S. Pat. No. 3,594,035 discloses a pickup truck rack. U.S. Pat. No. 5,002,324 to Griffin discloses a compactable utility rack for pickup trucks. U.S. Pat. No. 5,143,415 to Boudah discloses a disassemblable, lightweight truck utility rack. U.S. Pat. No. 5,110,021 to Damson, Jr. discloses a combination pipe rack and tool locker for a truck bed.

While these devices fulfill their respective, particular objective and requirements, the aforementioned patents do not describe an extendable carrier rack for pick-up trucks that allows items be transported thereon from one location to other and also serves as an extended working surface when removed from a pick-up truck and turned upside-down.

In this respect, the extendable carrier rack for pick-up trucks according to the present invention substantially departs from the conventional concepts and designs of the prior art, and in doing so provides an apparatus primarily developed for the purpose of holding and supporting items thereon from a bed of a pick-up truck for transporting from one location to another.

Therefore, it can be appreciated that there exists a continuing need for new and improved extendable carrier rack for pick-up trucks which can be used for holding and supporting items thereon from a bed of a pick-up truck for transporting from one location to another. In this regard, the present invention substantially fulfills this need.

SUMMARY OF THE INVENTION

In the view of the foregoing disadvantages inherent in the known types of pickup truck carrier racks now present in the prior art, the present invention provides an improved extendable carrier rack for pick-up trucks. As such, the general purpose of the present invention, which will be described subsequently in greater detail, is to provide a new and improved extendable carrier rack for pick-up trucks and method which has all the advantages of the prior art and none of the disadvantages.

To attain this, the present invention essentially comprises, in combination, a pair of rigid, generally tubular and L-shaped base legs with each leg having a horizontal outer side rail pivotally coupled to an outer support rail adapted to be extended upward, thus creating an upper free end, a lower free end, and a corner therebetween. A pair of rigid, generally tubular and L-shaped extension legs is included with each extension leg having a horizontal inner side rail pivotally coupled to an outer support rail adapted to be extended upward, thus creating an upper free end, a lower free end, and a corner therebetween with the lower free ends of the extension legs each telescopically mated with a separate lower free end of a base leg. A pair of rigid lower rail pins is included with each lower rail pin extended through a separate outer side rail of a base leg and the correspondingly mated inner side rail of an extension leg for allowing the telescopic and horizontal extension of each extension leg from its correspondingly mated base leg to be set. A pair of rigid cross rails is included with one cross rail horizontally extended between and coupled to the upper free ends of the base legs and the other cross rail horizontally extended between and coupled to the upper free ends of the extension legs. A pair of rigid and L-shaped bottom rails is included with one bottom rail horizontally extended between and coupled to the corners of the base legs and the other bottom rail horizontally extended between and coupled to the corners of the extension legs. A first pair and a second pair of rigid braces is included with each brace of the first pair angularly extended between and coupled to a separate outer side rail and the adjacent outer support rail of a separate base leg and each brace of the second pair extended between and coupled to a separate inner side rail and the adjacent outer support rail of a separate extension leg, whereby the base legs, extension legs, cross rails, bottom rails, and braces in combination define a pedestal having a rectangular base section and an upwardly extended legged section adapted to be placed in and secured to a bed of a truck. A sheet of plywood is coupled to the base section of the pedestal for defining an extended working surface when the base section of the pedestal is positioned upward and the legged section is positioned downward. A pair of rigid and u-shaped holding legs is included with each holding leg having squared-off corners. Each holding leg includes a horizontal top rail with a pair of spaced eyelets coupled thereto and a pair of inner extension rails extended downwards from the top rail and terminated at a pair of lower free ends with the lower free ends of one holding leg telescopically mated with and extendable from the upper free ends of the base legs and the lower free ends of the other holding leg telescopically mated with and extendable from the upper free ends of the extension legs. Lastly, a first pair a second pair of rigid upper rail pins is included with each upper rail pin of the first pair extended through a separate outer support rail of a base leg and the correspondingly mated inner extension rail of a u-shaped holding leg for allowing the telescopic extension of the first holding leg from the base legs to be set and each upper rail pin of the second pair extended through a separate outer support rail of an extension leg and the correspondingly mated inner extension rail of a u-shaped holding leg for allowing the telescopic extension of the second holding leg from the extension legs to be set. The extension of the holding legs from the pedestal defines a rack adapted for holding items thereon with the items further adapted to be secured with a pair of lines through the eyelets for securing the items to the rack for transport.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. No. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved extendable carrier rack for pick-up trucks which has all the advantages of the prior art pickup truck carrier racks and none of the disadvantages.

It is another object of the present invention to provide a new and improved extendable carrier rack for pick-up trucks which may be easily and efficiently manufactured and marketed.

It is a further object of the present invention to provide a new and improved extendable carrier rack for pick-up trucks which is of durable and reliable construction.

An even further object of the present invention is to provide a new and improved extendable carrier rack for pick-up trucks which is susceptible of a low cost of manufacture with regard to both materials and labor, and which accordingly is then susceptible of low prices of sale to the consuming public, thereby making such an extendable carrier rack for pick-up trucks economically available to the buying public.

Still yet another object of the present invention is to provide a new and improved extendable carrier rack for pick-up trucks which provides in the apparatuses and methods of the prior art some of the advantages thereof, while simultaneously overcoming some of the disadvantages normally associated therewith.

Even still another object of the present invention is to provide a new and improved extendable carrier rack for pick-up trucks for holding and supporting items thereon from a bed of a pick-up truck for transporting from one location to another.

Lastly, it is an object of the present invention to provide a new and improved extendable carrier rack comprising a pair of L-shaped base legs, each base leg having a horizontal outer side rail coupled to an upwardly extended outer support rail thus creating an upper free end, a lower free end, and a corner therebetween; a pair L-shaped extension legs, each extension leg having a horizontal inner side rail coupled to an upwardly extended outer support rail thus creating an upper free end, a lower free end, and a corner therebetween with the lower free ends of the extension legs each coupled with a separate free end of a base leg; a pair of L-shaped bottom rails with one bottom rail coupled to the corners of the separate base legs and the other bottom rail coupled to the corners of the separate extension legs, whereby the base legs, extension legs, and bottom rails define a pedestal having a base section and an upwardly extended legged section adapted to be placed in and secured to a vehicle; and a pair of u-shaped holding legs, each holding leg having a top rail and a pair of inner extension rails extended downwards therefrom and terminated at a pair of lower free ends with the lower free ends of one holding leg coupled with the upper free ends of the base legs and the lower free ends of the other holding leg with the upper free ends of the extension legs, whereby the extension of the holding legs from the pedestal defines a rack adapted for holding items thereon for transport.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a side elevational view of the present invention removed from a truck bed, turned upside down, and installed for use as a work table. A piece of plywood may be disposed across the pedestal to define an extended working surface.

FIG. 8 is a cross-sectional view of the coupling of the plywood top to the bottom portion of the pedestal.

The same reference numerals refer to the same parts through the various Figures.

DESCRIPTION OF THE PREFERRED EMBODIMENT

Figure 1:
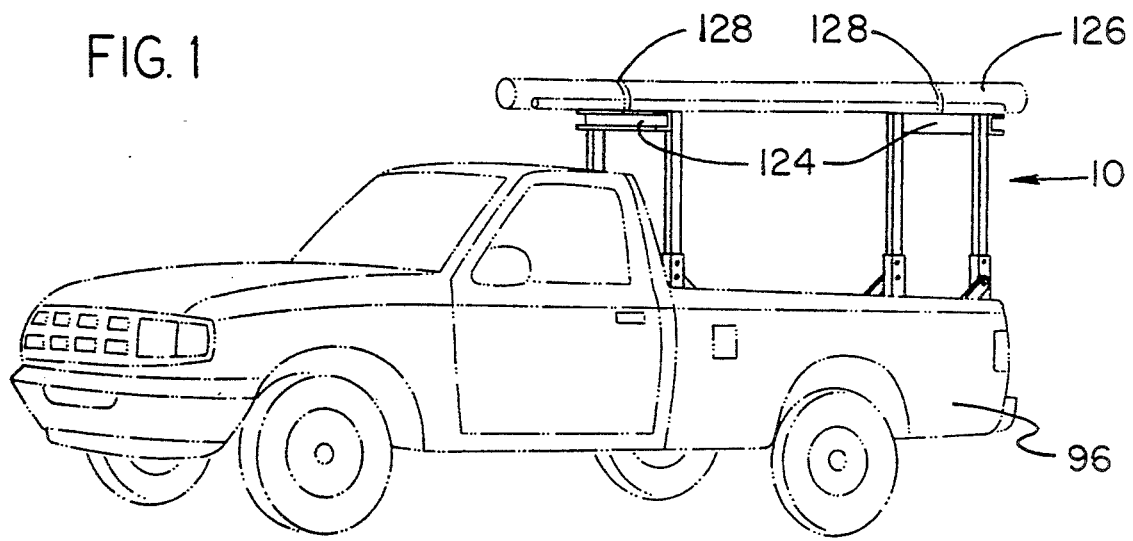
FIG. 1 is a side view of the preferred embodiment constructed in accordance with the principles of the present invention secured within a bed of a pickup truck.
Figure 2:
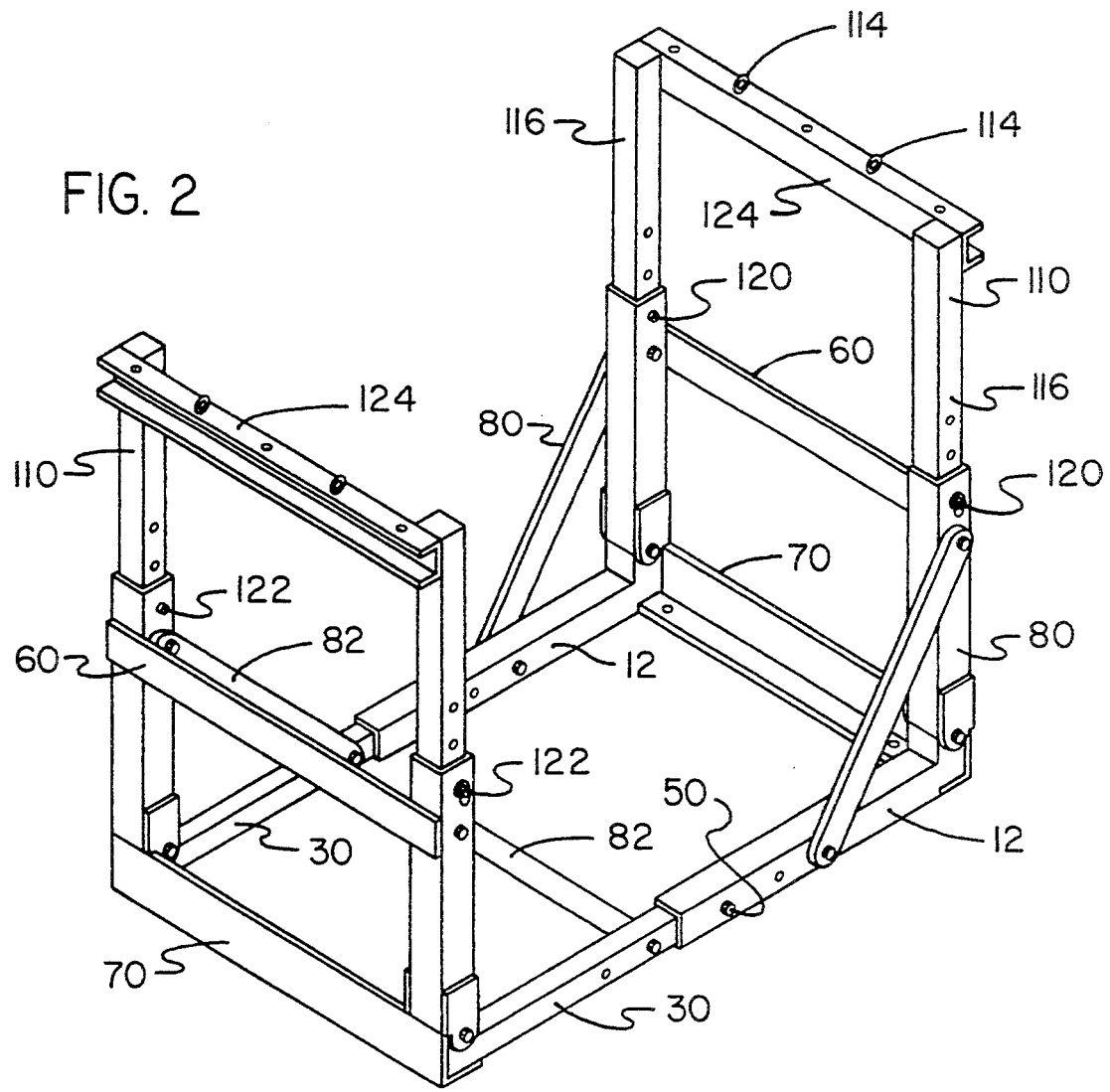
FIG. 2 is a perspective view of the preferred embodiment constructed in accordance with the principles of the present invention.
Figure 3:
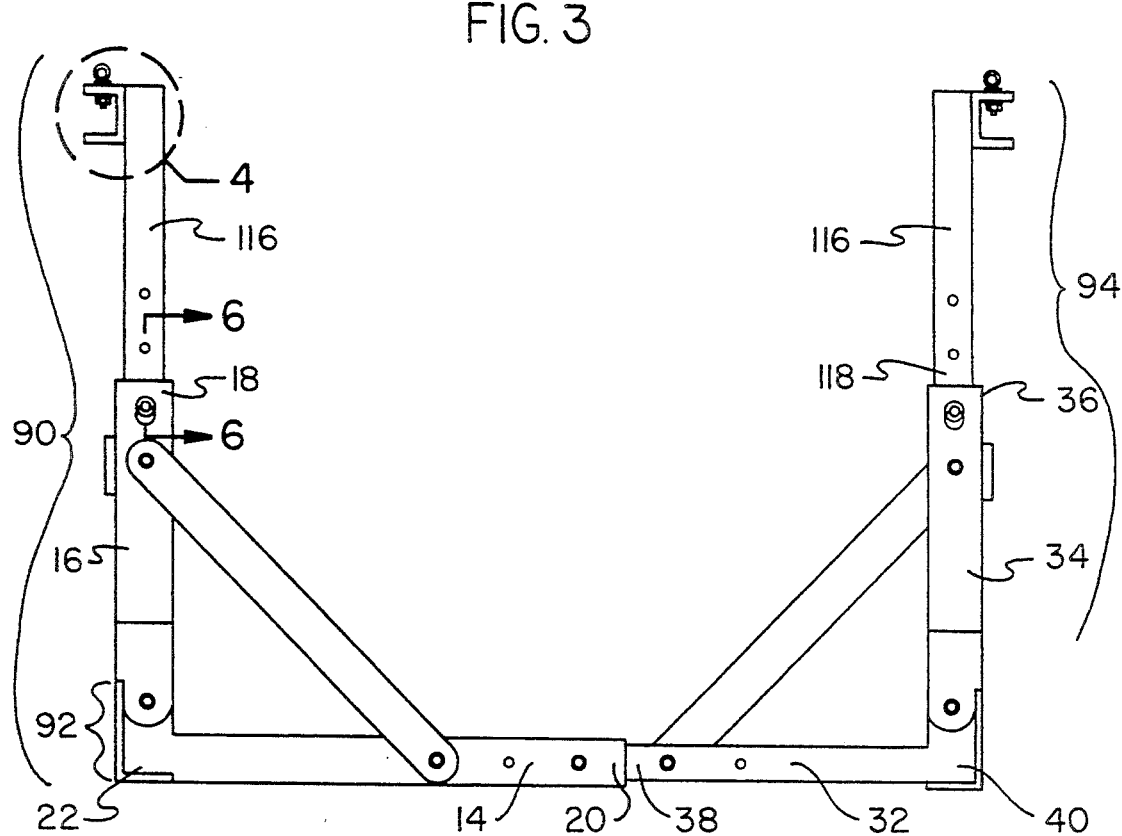
FIG. 3 is a side elevational view of the present invention of FIG. 2.
Figure 4:
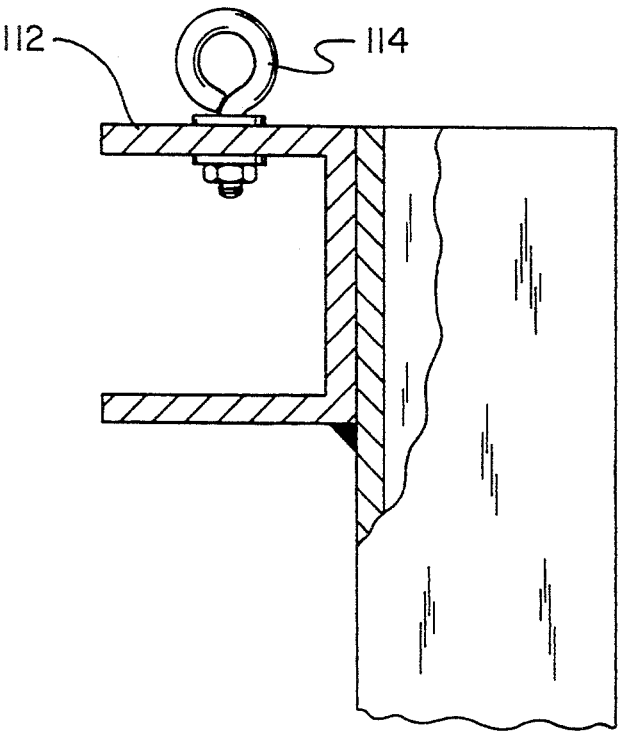
FIG. 4 is a enlarged cross-sectional view of an eye bolt secured to the top bolt of the holding leg.
Figure 5:
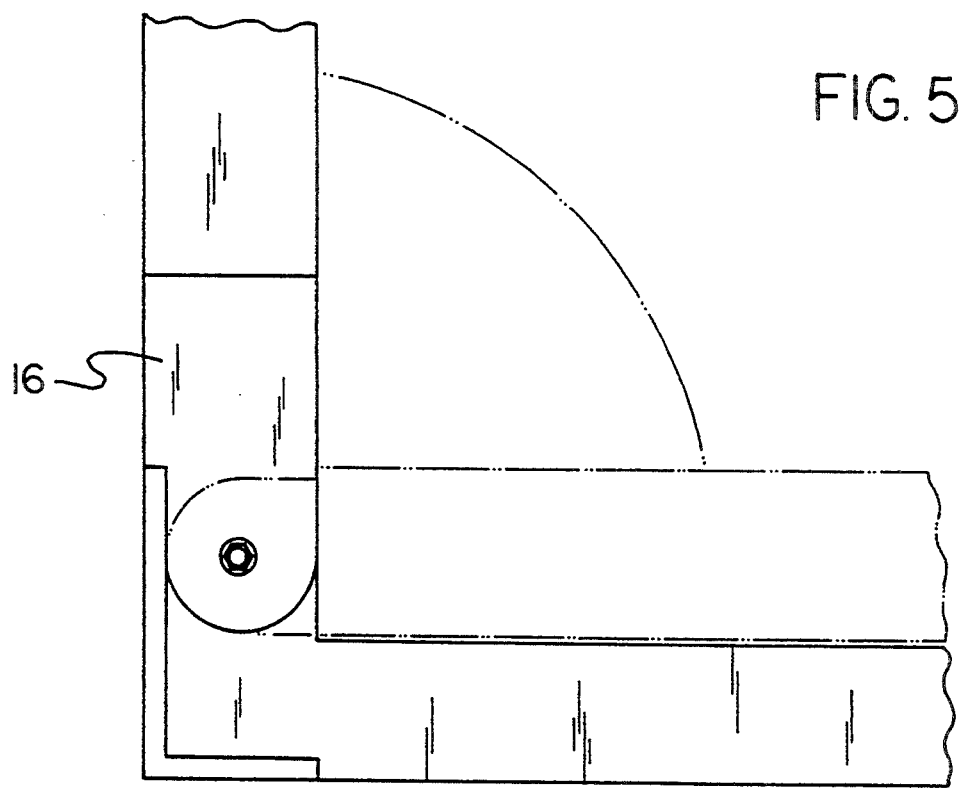
FIG. 5 is an enlarged view of the pivotal connection between the inner side rail and the outer support rail of an extension leg. The outer support rail is adapted to fold down upon the inner side rail to define a stowed configuration. The base legs of the present invention are also fordable in such a manner.
Figure 6:
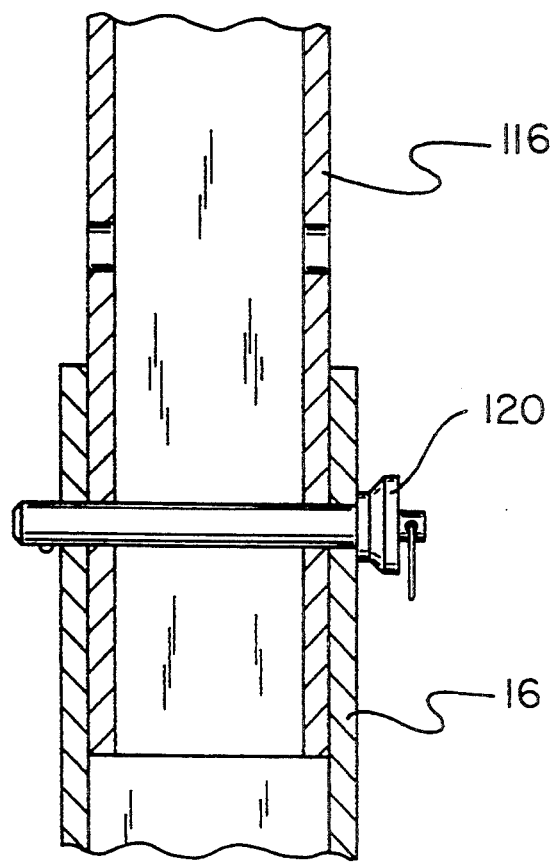
FIG. 6 is a cross-sectional view of a coupling between an upper rail pin, an outer support rail of a base leg, and a correspondingly mated inner extension leg of a u-shaped holding leg taken along the line 6—6 of FIG. 3.

With reference now to the drawings, and in particular, to FIG. 1 thereof, the preferred embodiment of the new and improved extendable carrier rack for pick-up trucks embodying the principles and concepts of the present invention and generally designated by the reference number 10 will be described.

Specifically, the present invention includes nine major components. The major components are the base legs, extension legs, lower rail pins, cross-rails, bottom rails, braces, plywood sheet, holding legs, and upper rail pins. These components are interrelated to provide the intended function.

More specifically, it will be noted in the various Figures that the first major component is the base legs 12. The present invention includes a pair of base legs. The base legs are rigid, generally tubular, and L-shaped in structure. Each leg has a horizontal outer side rail 14 pivotally coupled to an outer support rail 16. The outer support rail may be pivoted towards the outer side rail in a stowed configuration or pivoted upwards therefrom in an operable configuration. In an operable configuration, the outer side rail is adapted to be extended upward, thus creating an upper free end 18, a lower free hand 20, and a corner 22 therebetween.

The second major component is the extension legs 30. The present invention includes a pair of extension legs. The extension legs are rigid, generally tubular, and L-shaped in structure. Each extension leg has a horizontal inner side rail 32 pivotally coupled to an outer support rail 34. The outer support rail may be pivoted towards the inner side rail in a stowed configuration or pivoted upwards therefrom in an operable configuration. In an operable configuration, the outer support rail is adapted to be extended upward, thus creating a upper free end 36, a lower free end 38, and a corner 40 therebetween. The lower free ends of the extension legs are each telescopically mated with a separate lower free end 20 of a base leg. In this position, the lower support legs may be collapsed inwards towards the respective side rail to simultaneously place both legs in an essentially rectangular stowed configuration. Furthermore, both the inner side rail and the outer side rails have a plurality of adjustment holes extended therethrough for enabling the telescopic adjustment of the outer side rail of a base leg with respect to the corresponding inner side rail of an extension leg.

The third major component is the pair of lower rail pins 50. Each lower rail pin is rigid in structure and extended through an outer side rail 14 of a base leg and a correspondingly mated inner side rail 32 of an extension leg through the set of aligned adjustment holes. The lower rail pins allow the telescopic and horizontal extension of each extension leg from its horizontally mated base leg to be set. Each pin has a head on one end and a detente extended therefrom on the other end, thereby allowing the pin to remain in a coupled configuration with the base legs and extension legs once disposed therethrough. Each pin also has a loop formed thereon for allowing each pin to be secured to a separate chain or line to prevent it from being lost.

The fourth major component is the cross rails 60. The present invention includes a pair of cross rails. One of the cross rails is horizontally extended between and coupled to the upper free-ends 18 of the base legs. The other cross rail is horizontally extended between and coupled to the upper free ends 36 of the extension legs. The coupling of the cross rails between the legs provides stability to the base leg and extension leg arrangement.

The fifth major component is the bottom rails 70. The present invention includes a pair of rigid and L-shaped bottom rails. One bottom rail is horizontally extended between and coupled to the corners of the base legs 12. The other bottom rail is horizontally extended between and coupled to the corners of the extension legs 30. The coupling of the bottom rails between the legs also helps provide stability to the base leg and extension leg arrangement.

The sixth major component is the braces. The present invention includes a first pair of braces 80 and a second pair of braces 82. The braces are rigid in structure. Each brace of the first pair is angularly extended between and removably coupled to a separate outer side rail 14 and the adjacent outer support rail 16 of a separate base leg. Each brace of the second pair is extended between and removably coupled to a separate inner side rail 32 and the adjacent outer support rail 34 of a separate extension leg. The braces insure that the outer side rails of each leg are maintained in an upwardly extended position. The braces are removably coupled to the legs using bolts with complementary nuts secured thereto. At least one end of each brace must be decoupled in order to place the base legs and extension legs in the stowed configuration. The base legs, extension legs 30, bottom rails 70 and cross rails 60, and braces 80, 82 in combination define a pedestal 90 having a rectangular base section 92 and an upwardly extended legged section 94. The pedestal is adapted to be placed in a bed 96 of a truck with the base section secured to the floorboard of the bed.

The seventh major component is the sheet of plywood 100. The sheet of plywood is coupled to the base section 92 of the pedestal. This coupling is performed with a plurality of threaded bolts with complimentary washers and nuts. The coupling of the plywood to the base section of the pedestal defines and extended working surface. This working surface is placed in an operable mode when the pedestal is removed from the bed of the truck and placed such that the base section is positioned upwards and the legging section is positioned downward.

The eighth major component is the holding legs 110. The present invention includes a pair of holding legs. The holding legs are rigid in structure, they are also u-shaped with squared-off corners. Each holding leg has a horizontal top rail 112. A pair of spaced eyelets 114 are coupled thereto. Each eyelet has a loop on one end and a threaded portion on the other end. A plurality of eyelet holes are disposed through the top rail for allowing each eyelet to be adjustably positioned therethrough. The threaded portion is extended through the top rail and secured with a complimentary nut. A pair of inner extension rails 116 are extended downwards from the top rail. The inner extension rails are terminated at a pair of lower free ends 118. The lower free ends of one holding leg are telescopically mated with and extendable from the upper free ends 18 of the base legs. The lower free ends of the other holding leg are telescopically mated with and extendable from the upper free ends 36 of the extension legs. Both the upper free ends of the extension legs and the lower free ends of the holding legs have a plurality of aligned adjustment holes formed thereon for allowing their mutual extension to be set.

The ninth major component is the upper rail pins. The present invention includes a first pair 120 and a second pair 122 of upper rail pins. Each upper rail pin is rigid in structure. Each upper rail pin of the first pair is extended through a separate outer support rail 16 of a base leg and the correspondingly mated inner extension rail 116 of a u-shaped holding leg through a set of aligned adjustment holes therebetween for allowing the telescopic extension of the first holding leg from the base legs to be set. Each upper rail pin of the second pair is extended through a separate outer support rail 36 of an extension leg and the correspondingly mated inner extension rail 116 of a u-shaped holding leg through a set of aligned adjustment holes therebetween for allowing the telescopic adjustment of the second holding leg from the extension legs to be set. Each pin has a head on one end and a detente on the other end for insuring that the holding legs stay coupled with the base legs and the holding legs stay coupled with the extension legs one the upper rail pins have been disposed within the adjustment holes. The head of the pin also has a loop formed thereon adapted to be coupled with a chain for preventing it to be lost. The extension of the holding legs 110 from the pedestal defines a rack 124 adapted for holding items 126 thereon. The items are further adapted to be secured with a pair of lines 128 through the eyelets 114 for securing the items to the rack for transport.

In the preferred embodiment, both the pedestal and rack are made of metal or other similar rigid material. Another type of rigid material in lieu of plywood may be used to form the extended support surface, such as metal or plastic.

The present invention is designed for the man or woman who drives a customized pickup truck as a personal vehicle but also does the painting or handy work around the house. The present invention is designed for transporting long objects such as ladders, pipes, or lumber. The holding legs are extendable and when properly extended and secured in a truck bed and serves as a rack. The equipment can also serve as a work table by adjusting the legs and side rails, and turned upside-down. All that is required is an optional sheet of ¾" plywood cut to size and secured. When not in use, can be folded for storage in a closet.

Each top rail of a holding leg can be extended from about one foot three inches to about three foot three inches when measured from the bottom of the pedestal. The extension legs can be extended from the base legs about three feet to about seven feet. When the braces are removed, the outer support rail of the base leg can be folded down towards the outer side rail and the outer support rail of the extension leg can be folded downwards toward its inner side rail to place the present invention in a stowed configuration. The present invention can also be turned upside down to define a work bench with an extended working surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An extendable carrier rack for pickup trucks for holding and supporting items thereon from a bed of a pickup truck for transporting from one location to another comprising, in combination:

a pair of rigid, generally tubular and L-shaped base legs, each base leg having a horizontal outer side rail pivotally coupled to an outer support rail adapted to be extended upward, thus creating an upper free end, a lower free end, and a corner therebetween;

a pair of rigid, generally tubular and L-shaped extension legs, each extension leg having a horizontal inner side rail pivotally coupled to an outer support rail adapted to be extended upward, thus creating an upper free end, a lower free end, and a corner therebetween with the lower free ends of the extension legs each telescopically mated with a separate lower free end of a base leg;

a pair of rigid lower rail pins with each lower rail pin extended through a separate outer side rail of a base leg and the correspondingly mated inner side rail of an extension leg for allowing the telescopic and horizontal extension of each extension leg from its correspondingly mated base leg to be set;

a pair of rigid cross rails with one cross rail horizontally extended between and coupled to the upper free ends of the base legs and the other cross rail horizontally extended between and coupled to the upper free ends of the extension legs;

a pair of rigid and L-shaped bottom rails with one bottom rail horizontally extended between and coupled to the corners of the base legs and the other bottom rail horizontally extended between and coupled to the corners of the extension legs;

a first pair and a second pair of rigid braces with each brace of the first pair angularly extended between and coupled to a separate outer side rail and the adjacent outer support rail of a separate base leg and each brace of the second pair extended between and coupled to a separate inner side rail and the adjacent outer support rail of a separate extension leg, whereby the base legs, extension legs, cross rails, bottom rails, and braces in combination define a pedestal having a rectangular base section and an upwardly extended legged section adapted to be placed in and secured to a bed of a truck;

a sheet of plywood coupled to the base section of the pedestal for defining an extended working surface when the base section of the pedestal is positioned upward and the legged section is positioned downward;

a pair of rigid and u-shaped holding legs each having squared-off corners, each holding leg having a horizontal top rail with a pair of spaced eyelets coupled thereto and a pair of inner extension rails extended downwards from the top rail and terminated at a pair of lower free ends with the lower free ends of one holding leg telescopically mated with and extendable from the upper free ends of the base legs and the lower free ends of the other holding leg telescopically mated with and extendable from the upper free ends of the extension legs; and a first pair a second pair of rigid upper rail pins, each upper rail pin of the first pair extended through a separate outer support rail of a base leg and the correspondingly mated inner extension rail of a u-shaped holding leg for allowing the telescopic extension of the first holding leg from the base legs to be set, each upper rail pin of the second pair extended through a separate outer support rail of an extension leg and the correspondingly mated inner extension rail of a u-shaped holding leg for allowing the telescopic extension of the second holding leg from the extension legs to be set, whereby the extension of the holding legs from the pedestal define a rack adapted for holding items thereon with the items further adapted to be secured with a pair of lines through the eyelets for securing the items to the rack for transport.

2. An extendable carrier rack comprising:

a pair of L-shaped base legs, each base leg having a horizontal outer side rail coupled to an upwardly extended outer support rail this creating an upper free end, a lower free end, and a corner therebetween;

a pair L-shaped extension legs, each extension leg having a horizontal inner side rail coupled to an upwardly extended outer support rail thus creating an upper free end, a lower free end, and a corner therebetween with the lower free ends of the extension legs each coupled with a separate free end of a base leg;

a pair of L-shaped bottom rails with one bottom rail coupled to the corners of the separate base legs and the other bottom rail coupled to the corners of the separate extension legs, whereby the base legs, extension legs, and bottom rails define a pedestal having a base section and an upwardly extended legged section adapted to be placed in and secured to a vehicle; and a pair of u-shaped holding legs, each holding leg having a top rail and a pair of inner extension rails extended downwards therefrom and terminated at a pair of lower free ends with the lower free ends of one holding leg coupled with the upper free ends of the base legs and the lower free ends of the other holding leg with the upper free ends of the extension legs, whereby the extension of the holding legs from the pedestal defines a rack adapted for holding items thereon for transport; and a rigid plate coupled to the base section of the pedestal for defining an extended working surface when the base section of the pedestal is positioned upward and the legged section is positioned downward.

* * * * *